Oct. 28, 1941.          J. B. WINFREE, JR                    2,261,043
                       DOUGH FOLDING MACHINE
                    Filed March 1, 1940          6 Sheets-Sheet 1

Inventor,
John B. Winfree, Jr.
By Young, Emery & Thompson
Attys.

Oct. 28, 1941.   J. B. WINFREE, JR   2,261,043
DOUGH FOLDING MACHINE
Filed March 1, 1940   6 Sheets-Sheet 2
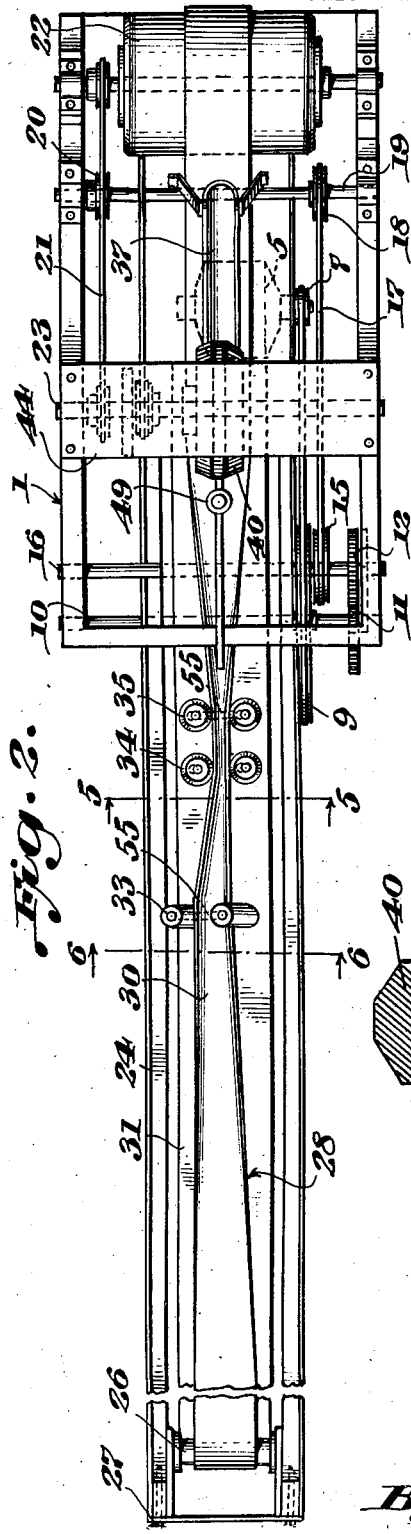
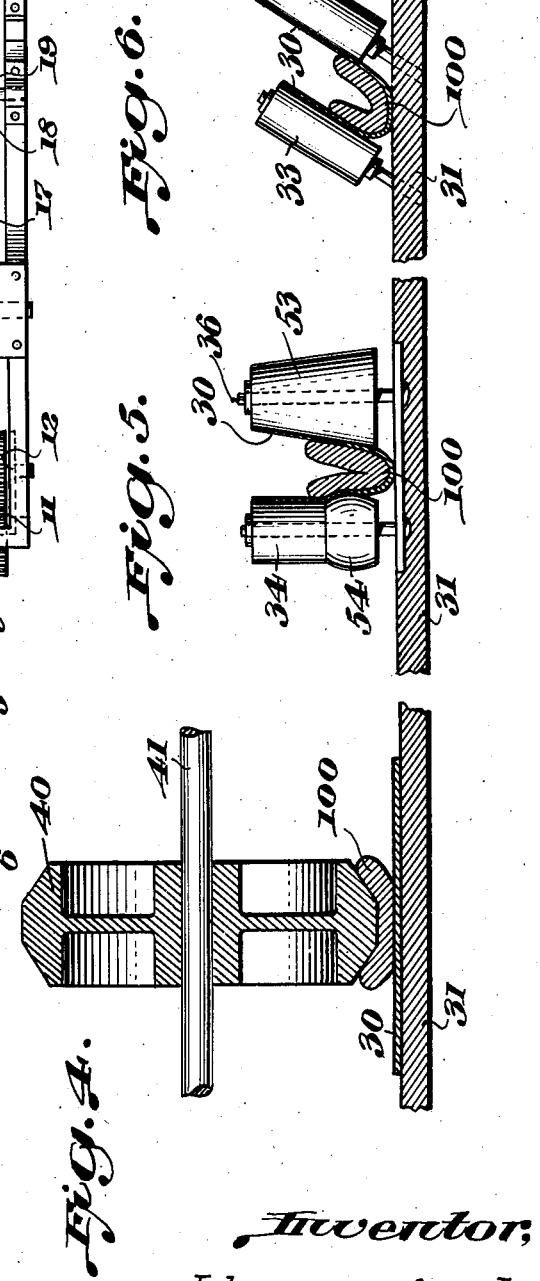
Inventor,
John B. Winfree, Jr.
By Young, Emery & Thompson
Attys.

Oct. 28, 1941.   J. B. WINFREE, JR   2,261,043
DOUGH FOLDING MACHINE
Filed March 1, 1940   6 Sheets-Sheet 3

Inventor:
John B. Winfree, Jr.

By Young, Emery & Thompson
attys.

Oct. 28, 1941.  J. B. WINFREE, JR  2,261,043
DOUGH FOLDING MACHINE
Filed March 1, 1940  6 Sheets-Sheet 4

Inventor,
John B. Winfree, Jr.

By Young, Emery & Thompson
Attys.

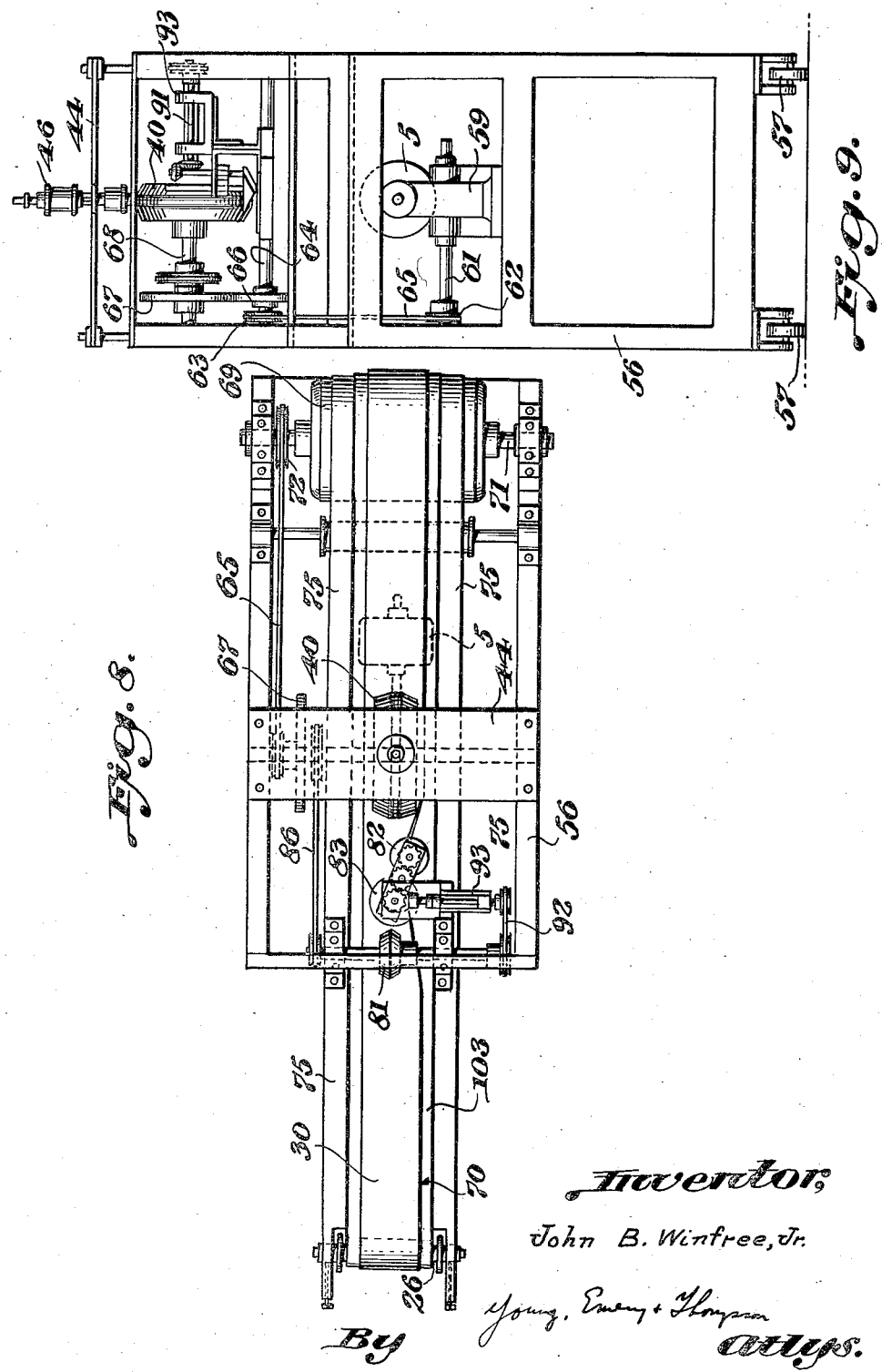

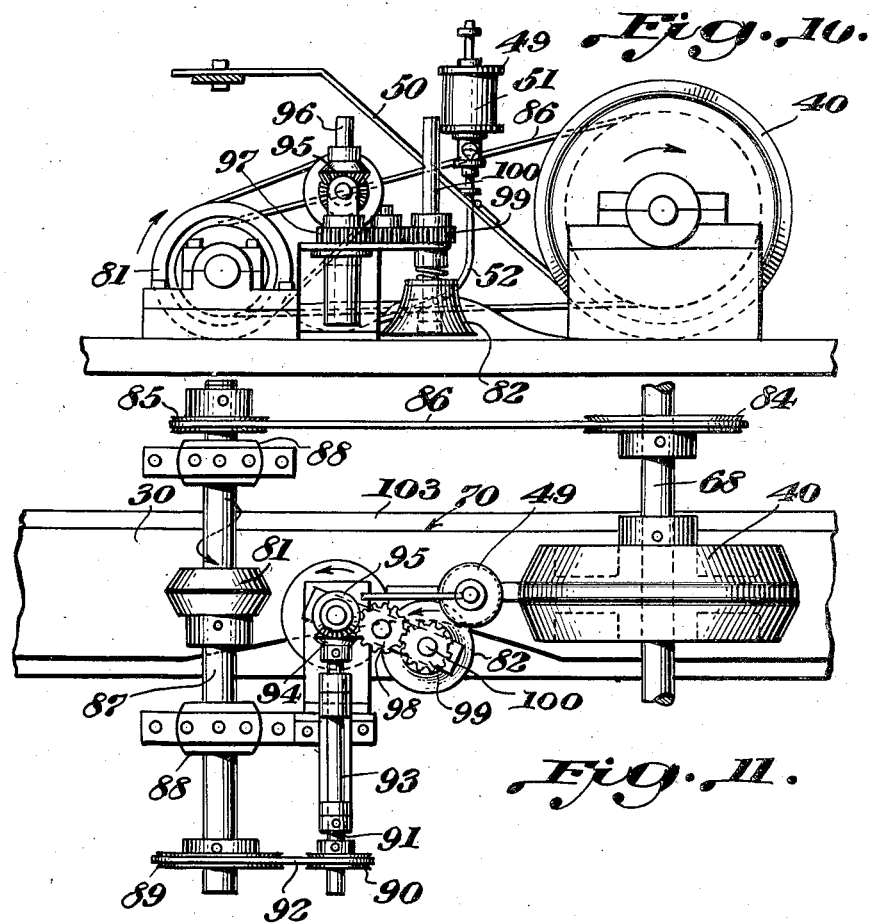
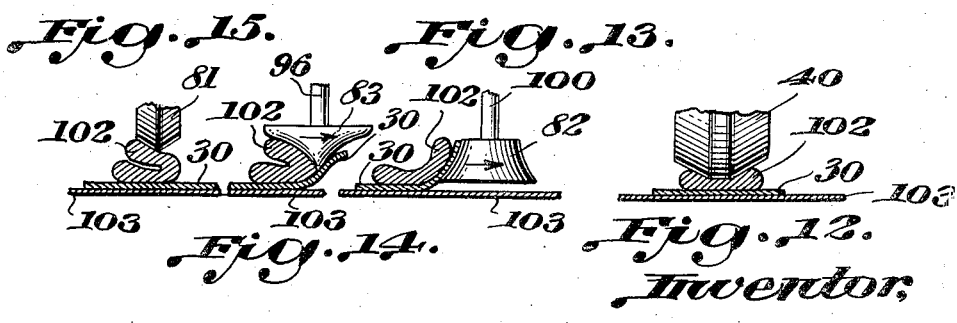

Patented Oct. 28, 1941

2,261,043

UNITED STATES PATENT OFFICE 2,261,043

DOUGH FOLDING MACHINE

John B. Winfree, Jr., Lynchburg, Va.

Application March 1, 1940, Serial No. 321,775

16 Claims. (Cl. 107—9)

The present invention relates to dough folding machines and more particularly to machines for successively folding batches or pieces of dough into the so-called Parker House or turnover rolls.

It is an object of the invention to provide a machine which will receive successive batches or pieces of dough cut or otherwise proportioned to the proper amount to produce the desired size of roll, to first flatten the batch or piece of dough and then fold it over by a number of stages or manipulations. It is a further object of the invention to provide an endless belt on which the dough is worked and shaped and to positively twist or distort the belt out of its normal plane of travel to form the fold in the dough.

Thus the main object of the present invention is to mechanically shape pieces of dough into certain types of rolls of the turnover variety. Since the molding of the pieces of dough is carried out on a machine it is possible to prepare comparatively uniform rolls.

Further objects will be apparent from the following description taken in connection with the accompanying drawings in which—

Figure 1:
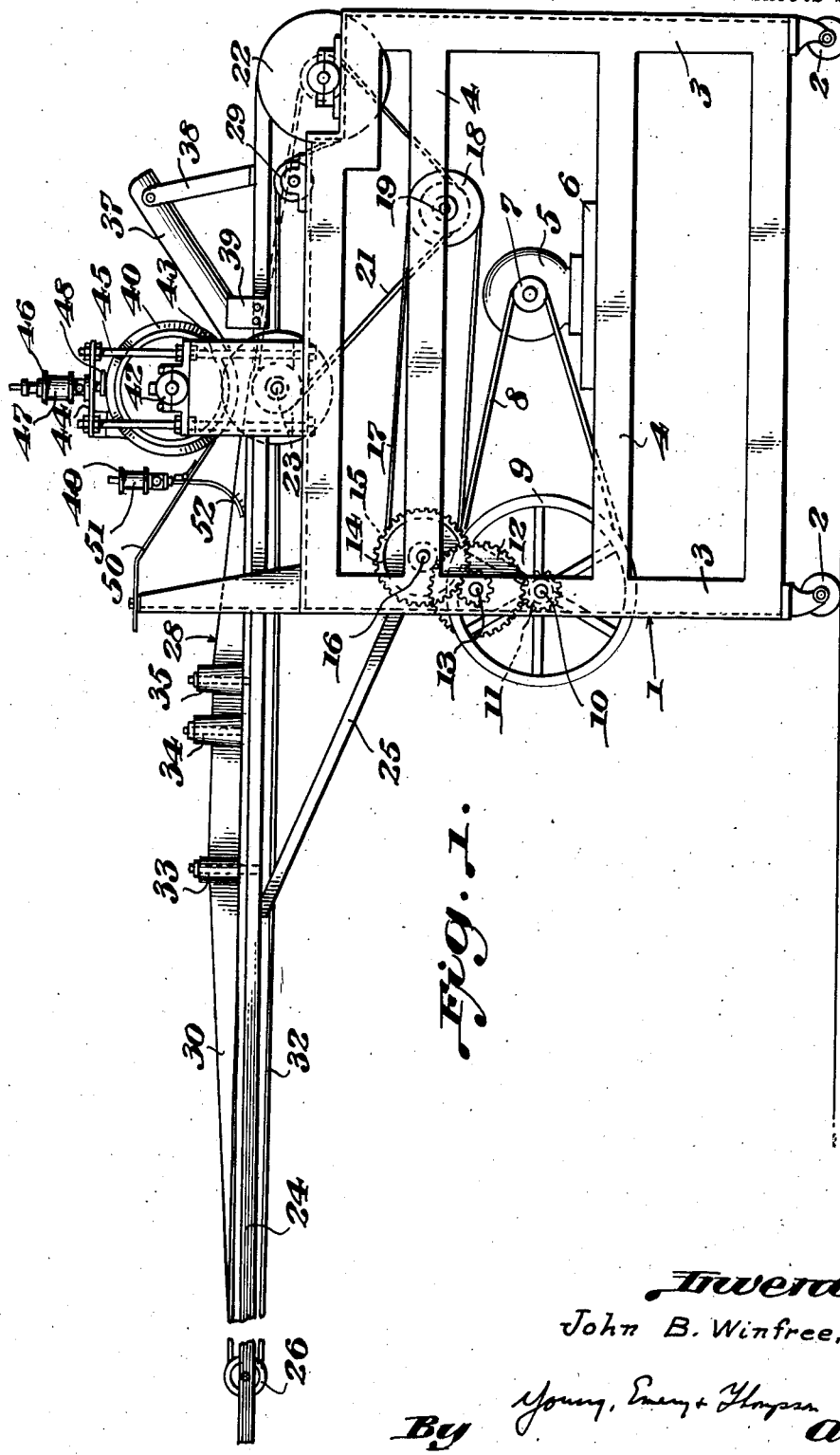
Figure 3:
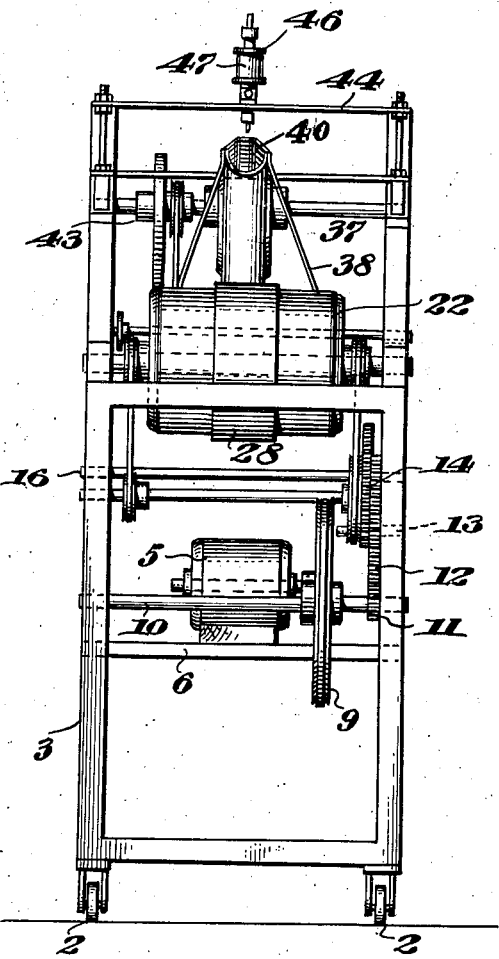
Figure 7:
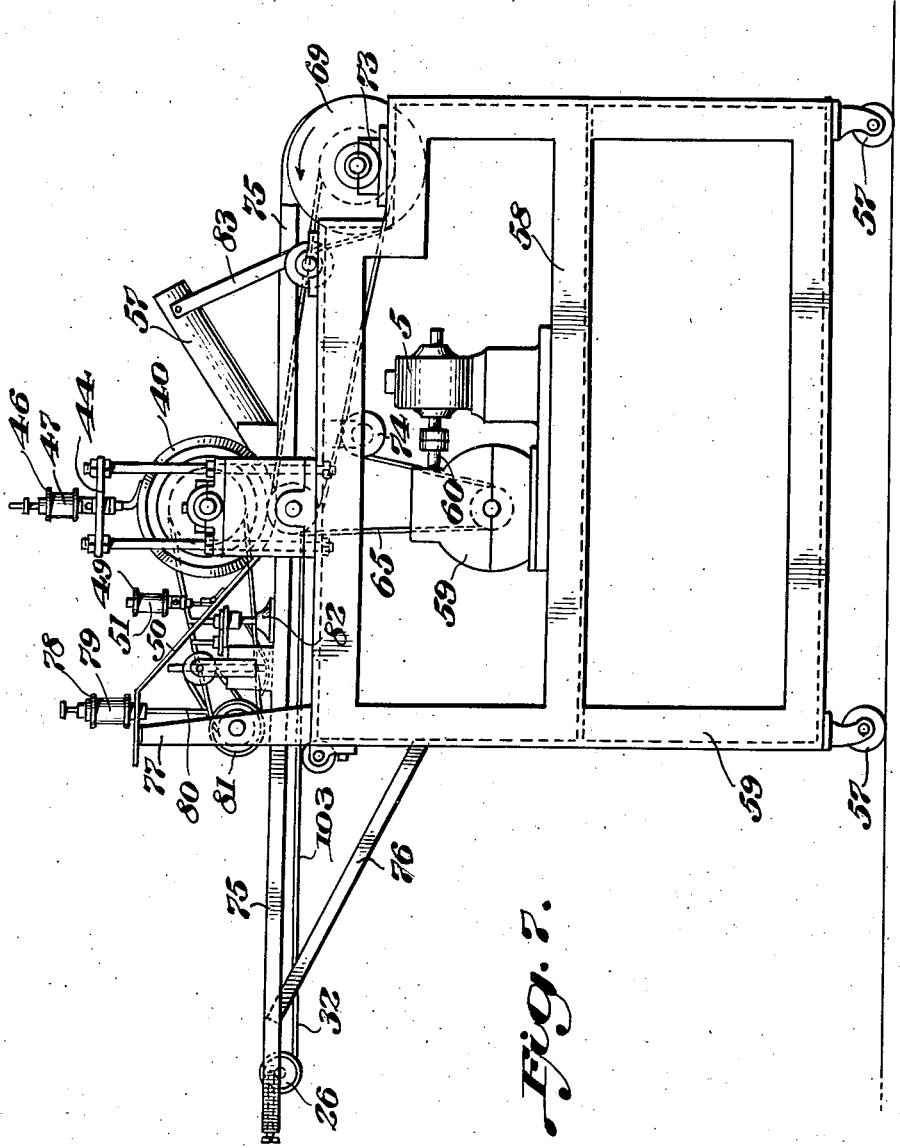

Figure 1 is a side elevation of a dough folding machine according to the invention, Fig. 2 is a plan view of the machine of Fig. 1, Fig. 3 is an end elevation of the machine of Fig. 1, Fig. 4 is a sectional view of the belt, flattening roller and a piece of dough, Fig. 5 is a cross-sectional view of the belt taken on line 5—5 of Figs. 1 and 2, Fig. 6 is a cross-sectional view of the belt taken on line 6—6 of Figs. 1 and 2, Fig. 7 is a side elevation of a modified dough folding machine, Fig. 8 is a plan view of the machine of Fig. 7, Fig. 9 is an end elevation of the machine of Fig. 7, Fig. 10 is a side elevation of a detail showing the flattening and folding means for a piece of dough of the machine of Figs. 7 to 9 on an enlarged scale, Fig. 11 is a plan view of Fig. 10, Fig. 12 is a part detailed view of the dough flattening roller of the machine of Figs. 7 to 9, Figs. 13 to 15 are detailed views of the first to third folding rollers respectively of the machine of Figs. 7 to 9, and Figs. 16 and 17 are sectional views showing details of the folding roll adjusting means.

The machine according to Figs. 1 to 6 is provided with a suitable base frame 1 mounted on swivelled rollers 2 so that the machine may be readily moved from place to place as a portable apparatus, although it can be permanently fastened down if desired. The base frame 1 may be made in any shape and of any suitable material but an open framework of metal angle irons is illustrated by way of an example and being composed of uprights 3 and lateral members 4 welded, bolted or riveted together. The machine is driven by an electric motor 5 mounted on a base 6 which latter is secured on two lateral members 4.

The motor 5 is provided with a drive pulley 7 which drives, by means of a V-shaped belt 8, a large driven pulley 9 securely mounted on and to rotate with the shaft 10. The shaft 10 rotates in suitable bearings in the frame 1 and has a gear 11 securely mounted thereon which meshes with a gear 12. The gear 12 is mounted on the stud 13 and has a pinion attached to mesh in 14, Fig. 3, and any suitable train of gears 14 may be provided depending upon the desired speed and the size of the motor. The gears 14 drive the sprocket wheel or pulley 15 on the shaft 16 and by means of a chain or belt 17, the wheel 15 drives the drive wheel 18 on the shaft 19. The sprocket wheel or pulley 20, Fig. 2, is secured on the shaft 19 to rotate therewith and, by means of a chain or belt 21, drives the roller 22 and the shaft 23.

As seen in Figs. 1 and 2 a horizontal frame work extension 24 is provided at the left-hand end of the base frame 1 supported by suitable braces 25 connected to the uprights 3. A freely rotatable roller 26 is mounted to rotate in the far end of the extension 24 and is adjustable in a horizontal direction by means of screws 27, Fig. 2. A supporting sheet or table 31 extends from the roller 26 to a flattening roller 40 suitably supported on a portion of the base frame 1 and the extension 24 and this elongated table is adapted to support an endless belt 28 which may be made of any suitable material such as cloth, canvas, leather, and the like. This belt 28 rolls around the roller 26 at the left end, Figs. 1 and 2, and the roller 22 at the right end, from the latter roller of which the belt is driven. The roller 29 is an idler roller to maintain the belt 28 from contact with the frame work 1 and also to increase the traction on the roller 22.

As clearly shown in Figs. 1 and 2 the top or upper run 30 of the belt 28 slides on the table or plate 31 whereas the bottom or lower run 32 returns freely back to the drive roller 22. The table 31 is provided with three pairs of upwardly projecting guide or folding rollers 33, 34 and 35, of which each roller is mounted to rotate freely on its spindle or shaft 36 and each spindle is adjustable on the table 31 by suitable slots therein or by any other means for the particular purpose of adjusting the two rollers of each pair toward or away from each other. The purpose of the rollers 33 to 35 is to twist the travel of the upper run 30 of the belt 28 for the purpose of working the dough batches into the required configuration as will be more fully explained hereinafter.

The machine is also provided with a curved trough or chute 37 supported at one end by a pair of bars 38 on the frame 1 and at the other end by plates 39. As shown in Fig. 1 the trough 37 is arranged at an angle relative to the horizontal travel of the belt 28 and this trough is adapted to intermittently feed batches or pieces of dough on the belt 28 just under and adjacent to the flattening roller 40. This roller 40 is mounted on and rotates with the shaft 41 which is rotatably mounted in bearings 42 supported on a frame 43, which latter is directly mounted on the frame 1. A plate 44 is mounted above the frame 43 and over the roller 40 and which is supported by rods 45 to which the plate 44 is bolted. The rods 45 are also bolted to the frame 43 and the plate 44 has an oiling device 46 secured thereto comprising a reservoir 47 for a suitable oil such as any vegetable oil, and an applicator 48 which is in contact with the roller 40 to coat the circumferential peripheral surface thereof to thereby prevent the batches or pieces of dough from sticking to the roller 40.

A second oiler 49 is mounted on a scraper blade 50 which latter is also secured on the frame 1. The oiler 49 consists of a reservoir 51 adapted to receive a supply of oil, for instance a vegetable oil, and a feeding tube 52 wipes the oil on every flattened piece of dough as the latter are carried by the belt 28 under the tube 52 for the purpose of slightly coating the upper surface of the dough with a film of oil so that when each piece of dough is folded or turned on itself and baked the resulting turnover roll may be easily separated since the oiled contacting surfaces will not firmly or readily stick or bake together.

The dough folding machine according to Figs. 1 to 6 operates as follows.

One by one the pieces or balls of dough each of the right amount to produce a finished roll, are dropped into the trough 37 and which then slide down onto the upper run 30 of the belt 28. As the piece of dough passes under the roller 40, Fig. 4, it is flattened into a somewhat V-shaped flat thick disk 100. At this point the upper run 30 of the belt 28 begins to assume a curved position which increases to the extent where, when the belt passes between the rollers 35, 34 and 33, the belt assumes an approximately V-shape which after passing the last set of rollers 33 begins to flatten out again. As the disk of dough passes under the oiler 49 a film of oil is wiped over the upper surface and the disk is gradually bent into a V-shape by the belt as restricted by the stationary but rotatable rollers 35. One of the rollers in the set 34 is a slightly frusto-conical roller 53 and the other roller 54 of this pair has a slightly curved peripheral surface around the lower half, Fig. 5. The pair of rollers 33, Fig. 6, are inclined relative to the vertical axis of the rotating rollers and this inclination forces the formed turnover roll 100 to gradually assume a horizontal position to be removed from the right hand end of the run 30 of the belt 28 by an attendant to be then placed in a pan for baking.

Figure 16:
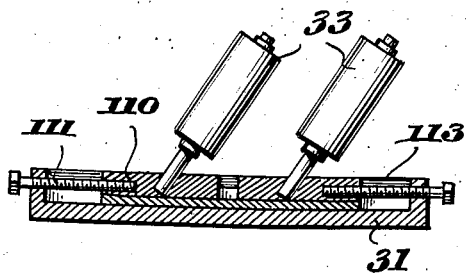
Figure 17:
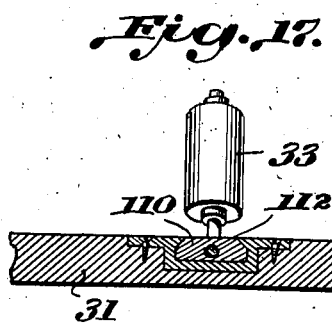

The rollers 33 to 36 are adjustably mounted in the table 31, Figs. 16 and 17, by means of elongated slots 55, Fig. 2, in the table so that the pairs of rollers may be adjusted to apply the desired pressure on the dough, by means of the belt as necessary to make a perfect roll.

The construction of Figs. 7 to 15 also includes a framework base 56 mounted on swiveled rollers 57 so that the apparatus may be rolled from place to place. An electric motor 5 is suitably mounted on the cross supports 58 of the base and this motor drives a reduction gear 59 by means of the shaft 60. A shaft 61 from the reduction gear 59 has a pulley or sprocket wheel 62, Fig. 9, securely mounted thereon which latter drives a pulley or sprocket wheel 63 securely mounted on the drive shaft 64 by means of a drive belt or chain 65. The shaft 64 is provided with a gear 66 securely mounted thereon which drives and is in mesh with a gear 67 securely mounted on the roller shaft 68. The chain or belt 65 also drives the drive roller 69 for the endless roll forming belt 70, Fig. 8, and for this purpose the shaft 71 on which the roller 69 is mounted is provided with a pulley or sprocket wheel 72. The shaft 71 is mounted on the frame base 56 by suitable bearings 73. The chain or belt 65 also passes over an idler pulley or sprocket wheel 74, Fig. 7, secured to the frame base 56.

The machine is likewise provided with a curved trough or chute 57 supported at one end by a pair of bars 83 on two angle frame members 75 which latter are mounted on and secured to the frame base 56. The members 75 are extended beyond the left hand end of the frame base 56, Figs. 7 and 8, and are supported by the bars 76.

Oilers 46 and 49 are also provided for the purpose of preventing the piece of dough from sticking to the roller 40 and to spread a film of oil on the flattened piece of dough. Likewise a scraper 50, mounted on the upright 77, Fig. 7, is provided to scrape any dough from the roller 40 which may have adhered thereto. A third oiler 78 having a reservoir 79 and a feeding tube 80 is also mounted on the scraper blade 50 and this device is adapted to drop oil, such as a vegetable oil, on a final pressing roller 81.

The endless belt 70 is mounted around and between the rollers 26 and 69 of which the latter is the driving roller. The belt 70 is however carried by a second belt 103 which latter is also provided around the rollers 26 and 69 but the belts 70 and 103 are not connected to each other but the roller 69 drives the belt 103 and the latter in turn the belt 70. Thus the belt 103 acts as a support for the upper run 30 of the belt 70.

The actual rollers which fold and form the turnover rolls are shown in Figs. 12 to 15 which may be termed as the flattening roller 40, the preliminary bending roller 82, the final bending and folding roller 83 and the final pressing roller 81. The rollers 82 and 83 are frusto-conical and conical respectively with the peripheral surfaces of both of spherical configuration. The drive for the rollers 81, 82 and 83 is illustrated in Figs. 10 and 11 in which a sprocket wheel or pulley 84 is secured to and is mounted on the shaft 68. This pulley 84 drives a pulley or sprocket wheel 85 by means of a chain or belt 86. The pulley 85 is securely mounted on a shaft 87 which latter is rotatably mounted in suitable bearings 88 on the frame members 75. Another sprocket wheel or pulley 89 is also mounted on the shaft 87 and this pulley drives a pulley or sprocket wheel 90 on the shaft 91, by means of the chain or belt 92. The shaft 91 is rotatably mounted in a bearing 93 and is provided with a bevel gear 94 meshing with a bevel gear 95. The gear 95 rotates and is mounted on a vertical shaft or spindle 96 which carries the folding roller 83, Fig. 14, and also a gear 97 which meshes with an idle gear 98 and the latter in turn with a gear 99. The gear 99 is mounted on and rotates the shaft 100 which carries the bending roller 82, Fig. 13.

The machine according to Figs. 7 to 15 operates as follows.

The batches or pieces of dough are successively dropped or fed into the chute 57 by means of which they are introduced one by one on the upper run 30 of the belt 70 adjacent the flattening roller 40, Fig. 12, where the piece of dough 102 is flattened out into a so-called cake or disk. One side of the upper run 30 of the belt, after passing under the roller 40, gradually begins to curl upwardly, Figs. 10 and 11, by means of the preliminary bending roller 82, Fig. 13, to gradually bent over the piece of dough 102. The immediately following folding roller 83, Fig. 14, folds the dough 102 and gradually forces the curled portion of the belt back to its horizontal plane of travel. The final pressing roller 81, Fig. 15, lightly presses the two folded halves of the piece of dough together and thereafter the completed turnover roll in its true configuration is ready to be removed from the belt and placed in a pan for baking.

I claim as my invention:

1. A machine for folding pieces of dough in the production of turnover rolls and the like, comprising a base frame, a pair of spaced rollers mounted to rotate on said frame, an endless belt mounted around and between said rollers whereby the upper and lower runs of the belt travel in substantially horizontal planes, a table member mounted under at least a portion of the upper run of the belt to support the latter, means secured on the table to contact with the upper run of the belt to distort the latter out of its horizontal plane travel over the table member, said distorting means including a plurality of pairs of rollers mounted on the table, means in the table for adjusting said pairs of rollers in a direction at right angles to the travel of the belt, and a curved trough angularly mounted on the frame for feeding pieces of dough on to the upper run of the belt which are shaped into turnover roll configuration when the belt carries said pieces of dough past the belt distorting means.

2. A machine for folding pieces of dough in the production of turnover rolls and the like, comprising a base frame, a pair of spaced rollers mounted to rotate on said frame, an endless belt mounted around and between said rollers whereby the upper and lower runs of the belt travel in substantially horizontal planes, a table member mounted under at least a portion of the upper run of the belt to support the latter, means secured on the table to contact with the upper run of the belt to distort the latter out of its horizontal plane travel over the table member, said distorting means including a plurality of pairs of rollers mounted on the table, means in the table for adjusting said pairs of rollers in a direction at right angles to the travel of the belt, and means in the base frame for driving one of said spaced rollers to thereby drive the belt.

3. A machine for folding pieces of dough in the production of turnover rolls and the like, comprising a base frame, a pair of spaced rollers mounted to rotate on said frame, an endless belt mounted around and between said rollers whereby the upper and lower runs of the belt travel in substantially horizontal planes, a table member mounted under at least a portion of the upper run of the belt to support the latter, means secured on the table to contact with the upper run of the belt to distort the latter out of its horizontal plane travel over the table member, said distorting means including a plurality of pairs of rollers mounted on the table, means in the table for adjusting said pairs of rollers in a direction at right angles to the travel of the belt, a flattening roller mounted to rotate on said base frame and arranged above the upper run of the belt to impart a preliminary flattening to the pieces of dough before folding, and means for feeding pieces of dough on to the upper run of the belt.

4. A machine for folding pieces of dough in the production of turnover rolls and the like, comprising a base frame, a pair of spaced rollers mounted to rotate on said frame, an endless belt mounted around and between said rollers whereby the upper and lower runs of the belt travel in substantially horizontal planes, a table member mounted under at least a portion of the upper run of the belt to support the latter, means secured on the table to contact with the upper run of the belt to distort the latter out of its horizontal plane travel over the table member, said distorting means including a plurality of pairs of rollers mounted on the table, means in the table for adjusting said pairs of rollers in a direction at right angles to the travel of the belt, a flattening roller mounted to rotate on said base frame and arranged above the upper run of the belt to impart a preliminary flattening to the pieces of dough before folding, means for feeding pieces of dough on the upper run of the belt, and means in the base frame for driving one of said spaced rollers to thereby drive the belt and also the flattening roller.

5. A machine for folding pieces of dough in the production of turnover rolls and the like, comprising a base frame, a pair of spaced rollers mounted to rotate on said frame, an endless belt mounted around and between said rollers whereby the upper and lower runs of the belt travel in substantially horizontal planes, a table member mounted under at least a portion of the upper run of the belt to support the latter, means secured on the table to contact with the upper run of the belt to distort the latter out of its horizontal plane travel over the table member, and means for feeding pieces of dough on the upper run of the belt which are shaped into turnover roll configuration when the belt carries said pieces of dough past the belt distorting means, the distortion means for the belt comprising two pairs of upwardly projecting guide rollers of which each two rollers of each pair are mounted in lateral spaced relationship and between which the upper run of the belt is distorted, and one pair of guide rollers being mounted on vertical axes of which one roller is slightly frusto-conical and the other is cylindrical in the upper portion and spherical in the lower portion.

6. A machine for folding pieces of dough in the production of turnover rolls and the like, comprising a base frame, a pair of spaced rollers mounted to rotate on said frame, an endless belt mounted around and between said rollers whereby the upper run of the belt travels in a substantially horizontal plane, a second endless belt mounted around said first-named belt, means in the base frame for rotating one of said rollers and to thus actuate the endless belts, and means for distorting a portion of the second endless belt out of its horizontal plane of travel to fold the pieces of dough.

7. A machine according to claim 6, in which said belt distorting means includes a frusto-conical roller which forces the second mentioned belt away from the first-mentioned belt to start the turning of the pieces of dough and a second conical roller to force the second-mentioned belt back to its original position and to complete the turning of the pieces of dough.

8. A machine for folding pieces of dough in the production of turnover rolls and the like, comprising a base frame, a pair of spaced rollers mounted to rotate on said frame, an endless belt mounted around and between said rollers whereby the upper run of the belt travels in a substantially horizontal plane, a second endless belt mounted around said first-named belt, means in the base frame for rotating one of said rollers and to thus actuate the endless belts, and four rollers for working and shaping the pieces of dough into turnover rolls.

9. A machine for folding pieces of dough in the production of turnover rolls and the like, comprising a base frame, a pair of spaced rollers mounted to rotate on said frame, an endless belt mounted around and between said rollers whereby the upper run of the belt travels in a substantially horizontal plane, a second endless belt mounted around said first-named belt, means in the base frame for rotating one of said rollers and to thus actuate the endless belts, and four rollers for working and shaping the pieces of dough into turnover rolls, one of said four rollers being a flattened roller to flatten the pieces of dough, the second roller being frusto-conical to impart a preleminary bending to the flattened pieces of dough by distorting a portion of the belt out of its horizontal plane travel, the third roller being conical to complete the turning of the pieces of dough, and the fourth roller being a final pressing roller to force the turned portions of the pieces of dough firmly on the unturned portions.

10. A machine according to claim 9, in which means are provided to drive the said four rollers from the means which drives the endless belts.

11. A machine for folding pieces of dough in the production of turnover rolls and the like, comprising a base frame, a pair of spaced rollers mounted to rotate on said frame, an endless belt mounted around and between said rollers whereby the upper run of the belt travels in a substantially horizontal plane, a second endless belt mounted around said first-named belt, means in the base frame for rotating one of said rollers and to thus actuate the endless belts, means for distorting a portion of the second endless belt out of its horizontal plane of travel to fold the pieces of dough, said belt distorting means including a frusto-conical roller which forces the second-mentioned belt away from the first-mentioned belt to start the turning of the pieces of dough and a second conical roller to force the second-mentioned belt back to its original position and to complete the turning of the pieces of dough, and a roller to impart a preliminary flattening to the pieces of dough.

12. In a machine for folding pieces of dough on a traveling belt in the production of turnover rolls and the like, a series of rollers to distort the belt and prepare and fold the dough including a preliminary bending roller of frusto-conical configuration to distort the belt, and a conical roller rotating on a vertical axis with the roller inverted to separate the belt from a part of the dough to assume its original position and to impart a final folding of the dough.

13. In a machine for folding pieces of dough on a traveling belt in the production of turnover rolls and the like, a preliminary roller to flatten the dough, a series of rollers to distort the belt and prepare and fold the dough including a preliminary bending roller of frusto-conical configuration to distort the belt, and a conical roller rotating on a vertical axis with the roller inverted to separate the belt from a part of the dough to assume its original position and to impart a final folding of the dough.

14. In a machine for folding pieces of dough on a traveling belt in the production of turnover rolls and the like, a preliminary roller to flatten the dough, a series of rollers to distort the belt and prepare and fold the dough including a preliminary bending roller of frusto-conical configuration to distort the belt, a conical roller rotating on a vertical axis with the roller inverted to separate the belt from a part of the dough to assume its original position and to impart a final folding of the dough, and a pressing roller to impart a final pressing action on the folded dough.

15. A machine for folding pieces of dough in the production of turnover rolls and the like, comprising a base frame, a table mounted on said frame, an endless belt mounted for horizontal travel on the table, means in the frame for operating the belt, a plurality of pairs of rollers mounted on the table for distorting the horizontal plane travel of the upper run of the belt to fold the pieces of dough on the belt, means in the table for adjusting each pair of rollers in a direction at right angles to the travel of the belt, and a roller to flatten the pieces of dough before such pieces of dough reach the distorted section of the belt.

16. A machine for folding pieces of dough in the production of turnover rolls and the like, comprising a base frame, a pair of spaced rollers rotatably mounted on said frame, an endless belt mounted for horizontal travel on the rollers, a table mounted on said frame on which the upper run of the belt travels, means in the frame for rotating one of said rollers to operate said belt, and means for distorting the horizontal plane travel of the upper run of the belt to fold the pieces of dough on the belt, said distorting means including a plurality of pairs of rollers mounted on the table and means in the table for adjusting said pairs of rollers in a direction at right angles to the travel of the belt.

JOHN B. WINFREE, Jr.